(12) United States Patent
Oliaei et al.

(10) Patent No.: US 8,489,044 B2
(45) Date of Patent: Jul. 16, 2013

(54) SYSTEM AND METHOD FOR REDUCING OR ELIMINATING TEMPERATURE DEPENDENCE OF A COHERENT RECEIVER IN A WIRELESS COMMUNICATION DEVICE

(75) Inventors: Omid Oliaei, Tempe, AZ (US); Stephen J. Rector, Tempe, AZ (US); Cristiano Benevento, Chandler, AZ (US)

(73) Assignee: Fujitsu Semiconductor Limited, Yokohama-shi (JP)

( * ) Notice: Subject to any disclaimer, the term of this patent is extended or adjusted under 35 U.S.C. 154(b) by 7 days.

(21) Appl. No.: 13/208,190

(22) Filed: Aug. 11, 2011

(65) Prior Publication Data

US 2013/0039394 A1 Feb. 14, 2013

(51) Int. Cl.
*H04B 1/04* (2006.01)
(52) U.S. Cl.
USPC .................. 455/114.3; 455/115.1; 455/126
(58) Field of Classification Search
USPC ................ 455/114.3, 115.1, 126, 127
See application file for complete search history.

(56) References Cited

U.S. PATENT DOCUMENTS

| | | | |
|---|---|---|---|
| 4,243,948 A | 1/1981 | Schade, Jr. .................. 330/289 |
| 4,590,418 A * | 5/1986 | Moriarty, Jr. ................ 323/313 |
| 5,125,112 A | 6/1992 | Pace et al. .................... 455/343 |
| 5,920,808 A * | 7/1999 | Jones et al. ................ 455/127.1 |
| 6,265,857 B1 | 7/2001 | Demsky et al. .............. 323/312 |
| 6,340,882 B1 * | 1/2002 | Chung et al. ................. 323/315 |
| 6,459,326 B2 * | 10/2002 | Descombes .................. 327/513 |
| 6,628,169 B2 | 9/2003 | Ivanov et al. ................. 330/256 |
| 6,664,847 B1 * | 12/2003 | Ye ................................. 327/543 |
| 6,819,164 B1 | 11/2004 | Chen ............................. 327/540 |
| 6,911,861 B2 * | 6/2005 | Deng ............................ 327/513 |
| 6,967,526 B1 | 11/2005 | Churchill .......................... 330/9 |
| 7,288,983 B1 * | 10/2007 | Schwartsglass et al. ...... 327/513 |
| 7,439,601 B2 * | 10/2008 | Hartley ......................... 257/467 |
| 7,636,009 B2 | 12/2009 | Jo et al. ......................... 327/539 |
| 7,880,534 B2 * | 2/2011 | Huang et al. .................. 327/539 |
| 2005/0030090 A1 | 2/2005 | Deng ............................. 327/539 |
| 2006/0125547 A1 | 6/2006 | Maymandi-Nejad et al. ............................. 327/512 |
| 2009/0110027 A1 * | 4/2009 | Chellappa ..................... 374/178 |
| 2011/0057718 A1 | 3/2011 | Snoeij et al. .................. 327/512 |

* cited by examiner

*Primary Examiner* — Duc M Nguyen
(74) *Attorney, Agent, or Firm* — Baker Botts L.L.P.

(57) ABSTRACT

In accordance with some embodiments of the present disclosure, a method may include generating a first current equal to a bandgap voltage divided by a resistance selected to approximately match a process resistance integral to a receiver. The method may further include generating a second current equal to temperature-dependent current multiplied by a predetermined scaling factor. The method may also include subtracting the second current from the first current to generate a bias current. The method may additionally include providing the bias current to the receiver.

17 Claims, 4 Drawing Sheets

SYSTEM AND METHOD FOR REDUCING OR ELIMINATING TEMPERATURE DEPENDENCE OF A COHERENT RECEIVER IN A WIRELESS COMMUNICATION DEVICE

TECHNICAL FIELD

The present disclosure relates generally to wireless communication and, more particularly, to reducing or eliminating temperature dependence of a coherent receiver in a wireless communication device.

BACKGROUND

Wireless communications systems are used in a variety of telecommunications systems, television, radio and other media systems, data communication networks, and other systems to convey information between remote points using wireless transmitters and wireless receivers. A transmitter is an electronic device which, usually with the aid of an antenna, propagates an electromagnetic signal such as radio, television, or other telecommunications. Transmitters often include digital signal processing circuits which encode a data signal, upconverts it to a radio frequency signal, and passes it signal amplifiers which receive the radio-frequency, amplify the signal by a predetermined gain, and transmit the amplified signal through an antenna. On the other hand, a receiver is an electronic device which, also usually with the aid of an antenna, receives and processes a wireless electromagnetic signal. In certain instances, a transmitter and receiver may be combined into a single device called a transceiver.

A wireless communication device may include, in addition to a transmitter and a receiver, a coherent receiver as part of a feedback control path for monitoring and control of the transmitter. For example, such a feedback control path may provide for monitoring of a phase shift in a transmit path, an output power intensity of a transmit path, and/or other parameters. In addition, based on such monitoring, the control path may control operational parameters in order to provide desired behavior within the transmit path. To ensure accurate monitoring and control, the gain characteristics of the feedback control path must remain substantially constant over temperature.

SUMMARY

In accordance with some embodiments of the present disclosure, a method may include generating a first current equal to a bandgap voltage divided by a resistance selected to approximately match a process resistance integral to a receiver. The method may further include generating a second current equal to temperature-dependent current multiplied by a predetermined scaling factor. The method may also include subtracting the second current from the first current to generate a bias current. The method may additionally include providing the bias current to the receiver.

Technical advantages of the present disclosure may be readily apparent to one skilled in the art from the figures, description and claims included herein.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
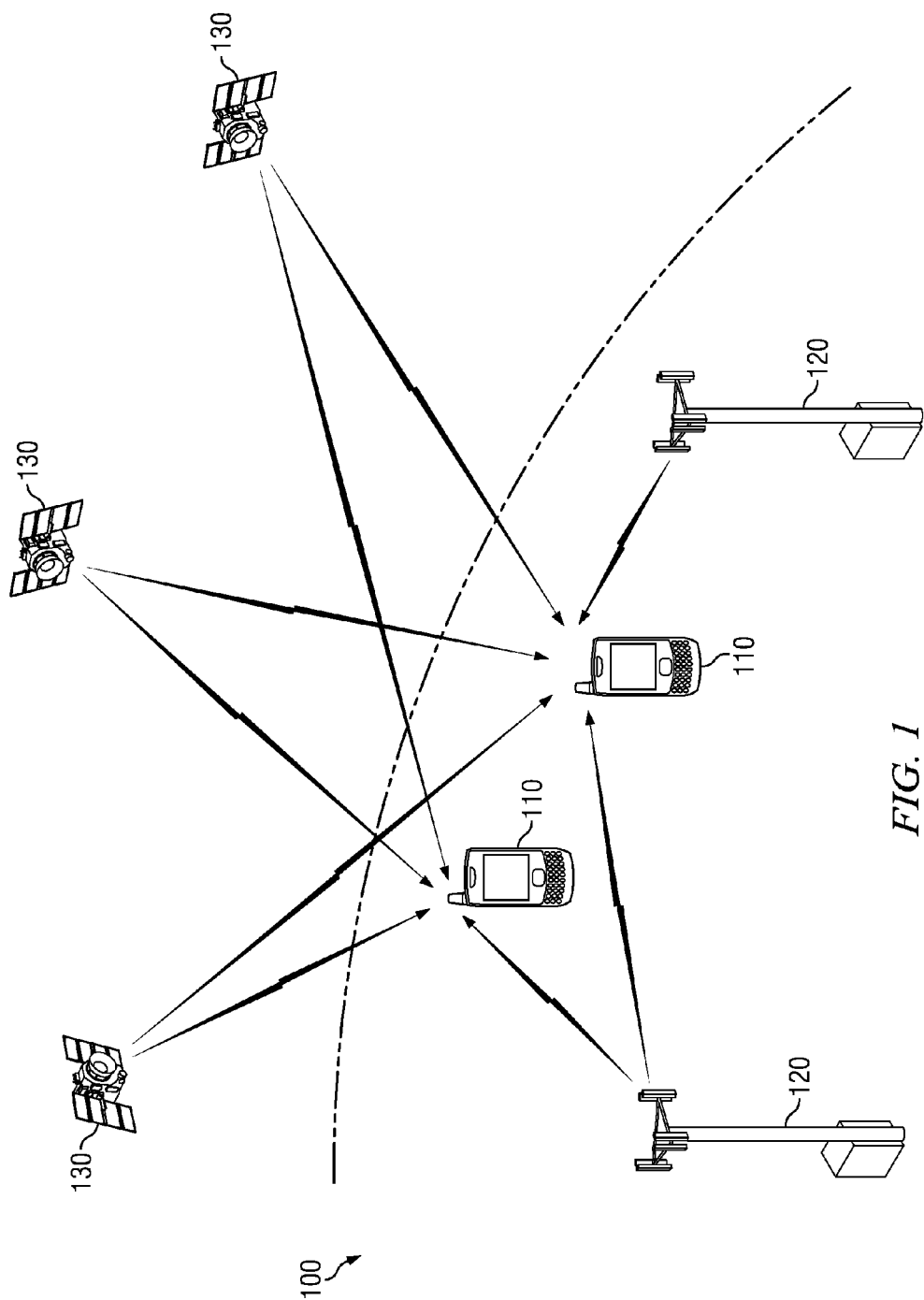
FIG. 1 illustrates a block diagram of an example wireless communication system, in accordance with certain embodiments of the present disclosure.

FIG. 1 illustrates a block diagram of an example wireless communication system 100, in accordance with certain embodiments of the present disclosure. For simplicity, only two terminals 110 and two base stations 120 are shown in FIG. 1. A terminal 110 may also be referred to as a remote station, a mobile station, an access terminal, user equipment (UE), a wireless communication device, a cellular phone, or some other terminology. A base station 120 may be a fixed station and may also be referred to as an access point, a Node B, or some other terminology.

A terminal 110 may or may not be capable of receiving signals from satellites 130. Satellites 130 may belong to a satellite positioning system such as the well-known Global Positioning System (GPS). Each GPS satellite may transmit a GPS signal encoded with information that allows GPS receivers on earth to measure the time of arrival of the GPS signal. Measurements for a sufficient number of GPS satellites may be used to accurately estimate a three-dimensional position of a GPS receiver. A terminal 110 may also be capable of receiving signals from other types of transmitting sources such as a Bluetooth transmitter, a Wireless Fidelity (Wi-Fi) transmitter, a wireless local area network (WLAN) transmitter, an IEEE 802.11 transmitter, and any other suitable transmitter.

In FIG. 1, each terminal 110 is shown as receiving signals from multiple transmitting sources simultaneously, where a transmitting source may be a base station 120 or a satellite 130. In certain embodiments, a terminal 110 may also be a transmitting source. In general, a terminal 110 may receive signals from zero, one, or multiple transmitting sources at any given moment.

System 100 may be a Code Division Multiple Access (CDMA) system, a Time Division Multiple Access (TDMA) system, or some other wireless communication system. A CDMA system may implement one or more CDMA standards such as IS-95, IS-2000 (also commonly known as "1x"), IS-856 (also commonly known as "1xEV-DO"), Wideband-CDMA (W-CDMA), and so on. A TDMA system may implement one or more TDMA standards such as Global System for Mobile Communications (GSM). The W-CDMA standard is defined by a consortium known as 3GPP, and the IS-2000 and IS-856 standards are defined by a consortium known as 3GPP2.

Figure 2:
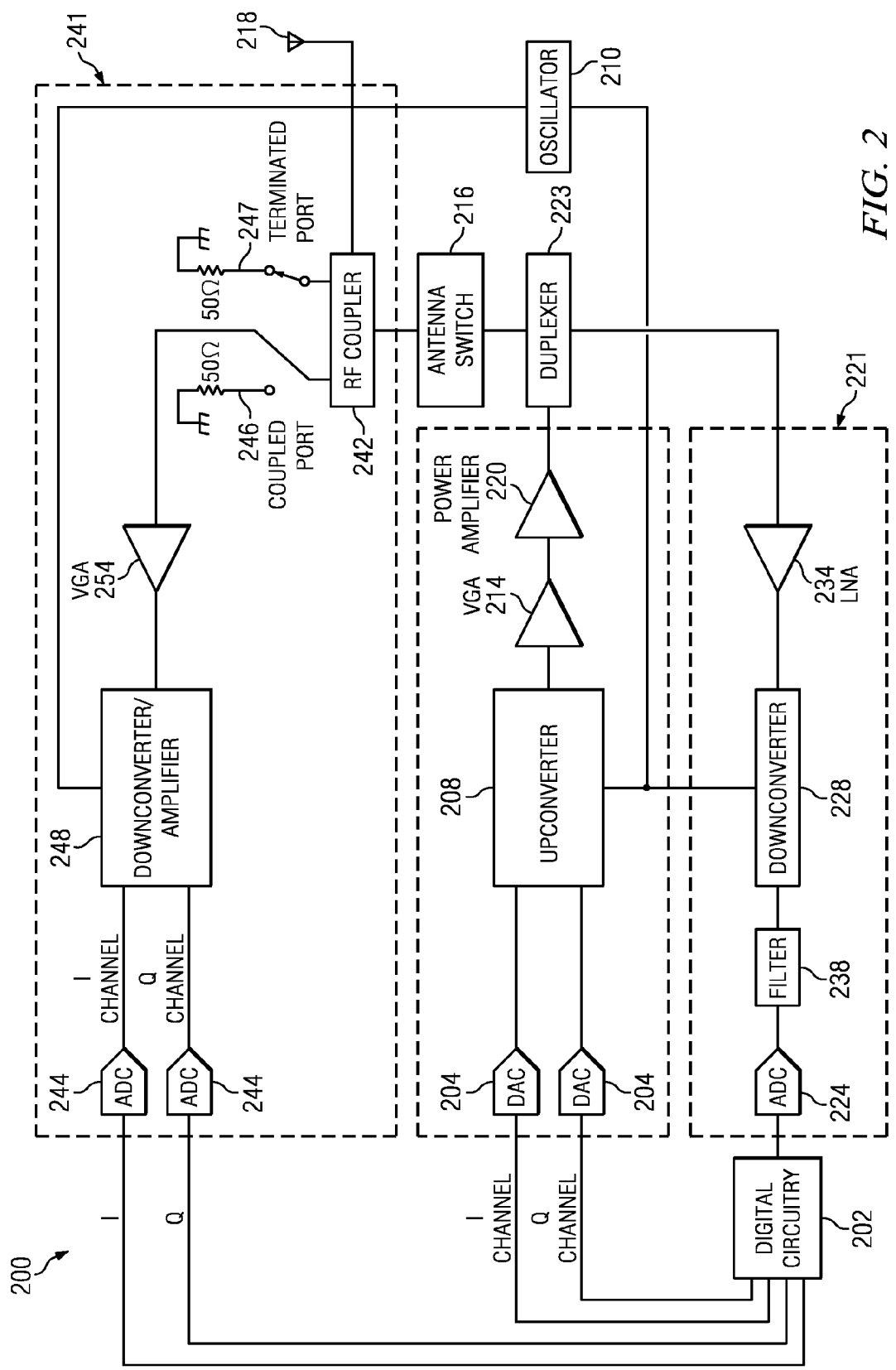
FIG. 2 illustrates a block diagram of selected components of an example transmitting and/or receiving element, in accordance with certain embodiments of the present disclosure.

FIG. 2 illustrates a block diagram of selected components of an example transmitting and/or receiving element 200 (e.g., a terminal 110, a base station 120, or a satellite 130), in accordance with certain embodiments of the present disclosure. Element 200 may include a transmit path 201, a receive path 221, and a feedback control path 241. Depending on the functionality of element 200, element 200 may be considered a transmitter, a receiver, or a transceiver.

As depicted in FIG. 2, element 200 may include digital circuitry 202. Digital circuitry 202 may include any system, device, or apparatus configured to process digital signals and information received via receive path 221 and/or feedback control path 241, and/or configured to process signals and information for transmission via transmit path 201. Such digital circuitry 202 may include one or more microprocessors, digital signal processors, and/or other suitable devices. As shown in FIG. 2, digital circuitry 202 may communicate in-phase (I) channel and quadrature (Q) channel components of a digital signal to transmit path 201.

Transmit path 201 may include a digital-to-analog converter (DAC) 204 for each of the I channel and Q channel signals communicated by digital circuitry 202. Each DAC 204 may be configured to receive its respective I or Q channel component of the digital signal from digital circuitry 202 and convert such digital signal into an analog signal. Such analog signal may then be passed to one or more other components of transmit path 201, including upconverter 208.

Upconverter 208 may be configured to frequency upconvert an analog signal received from DAC 204 to a wireless communication signal at a radio frequency based on an oscillator signal provided by oscillator 210. Oscillator 210 may be any suitable device, system, or apparatus configured to produce an analog waveform of a particular frequency for modulation or upconversion of an analog signal to a wireless communication signal, or for demodulation or downconversion of a wireless communication signal to an analog signal. In some embodiments, oscillator 210 may be a digitally-controlled crystal oscillator.

Transmit path 201 may include a variable-gain amplifier (VGA) 214 to amplify an upconverted signal for transmission, and a power amplifier 220 to further amplify the analog upconverted signal for transmission via antenna 218. The output of power amplifier 220 may be communicated to duplexer 223. A duplexer 223 may be interfaced between antenna switch 216 and each transmit path 201 and receive path 221. Accordingly, duplexer 223 may allow bidirectional communication through antenna 218 (e.g., from transmit path 201 to antenna 218, and from antenna 218 to receive path 221).

Antenna switch 216 may be coupled between duplexer 224 and antenna 218. Antenna switch 216 may configured to multiplex the output of two or more power amplifiers (e.g., similar to power amplifier 220), in which each power amplifier may correspond to a different band or band class. Antenna switch 216 may allow duplexing of signals received by antenna 218 to a plurality of receive paths of different bands or band classes.

Antenna 218 may receive the amplified signal from antenna switch 216 (e.g., via RF coupler 242) and transmit such signal (e.g., to one or more of a terminal 110, a base station 120, and/or a satellite 130). As shown in FIG. 2, antenna 218 may be coupled to each of transmit path 201 and receive path 221.

Receive path 221 may include a low-noise amplifier 234 configured to receive a wireless communication signal (e.g., from a terminal 110, a base station 120, and/or a satellite 130) via antenna 218, antenna tuner 217, and duplexer 223. LNA 234 may be further configured to amplify the received signal.

Receive path 221 may also include a downconverter 228. Downconverter 228 may be configured to frequency downconvert a wireless communication signal received via antenna 218 and amplified by LNA 234 by an oscillator signal provided by oscillator 210 (e.g., downconvert to a baseband signal). Receive path 221 may further include a filter 238, which may be configured to filter a downconverted wireless communication signal in order to pass the signal components within a radio-frequency channel of interest and/or to remove noise and undesired signals that may be generated by the downconversion process. In addition, receive path 221 may include an analog-to-digital converter (ADC) 224 configured to receive an analog signal from filter 238 and convert such analog signal into a digital signal. Such digital signal may then be passed to digital circuitry 202 for processing.

Feedback control path 241 may in general be configured to monitor one or more parameters of transmit path 201 (e.g., gain, phase shift, etc.), and transmit a digital signal indicative of such parameters to digital circuitry 202 for analysis and/or control of transmit path 201. For example, based on monitored parameters, digital circuitry may modify I channel and Q channel signals communicated to transmit path 202, modify gain parameters of components of transmit path 201, and/or may take other actions.

As shown in FIG. 2, feedback control path 241 may include a radio frequency (RF) coupler 242. RF coupler 242 may be any system, device or apparatus configured to couple at least a portion of the transmission power in the transmission line coupling antenna switch 216 to antenna 218 to one or more output ports. As known in the art, one of the output ports may be known as a coupled port (e.g., coupled port 246 as shown in FIG. 2) while the other output port may be known as a terminated or isolated port (e.g., terminated port 247 as shown in FIG. 2). In many cases, each of coupled port 246 and terminated port 247 may be terminated with an internal or external resistance of a particular resistance value (e.g., 50 ohms). Due to the physical properties of RF coupler 242, during operation of element 200, coupled port 246 may carry an analog signal (e.g., a voltage) indicative of incident power transmitted to antenna 218 while terminated port 247 may carry an analog signal (e.g., a voltage) indicative of power reflected from antenna 218.

Feedback control path 241 may include a variable gain amplifier (VGA) 254 to amplify signals communicated from RF coupler 242, and communicate such amplified signals to downconverter/amplifier 248.

Figure 4:
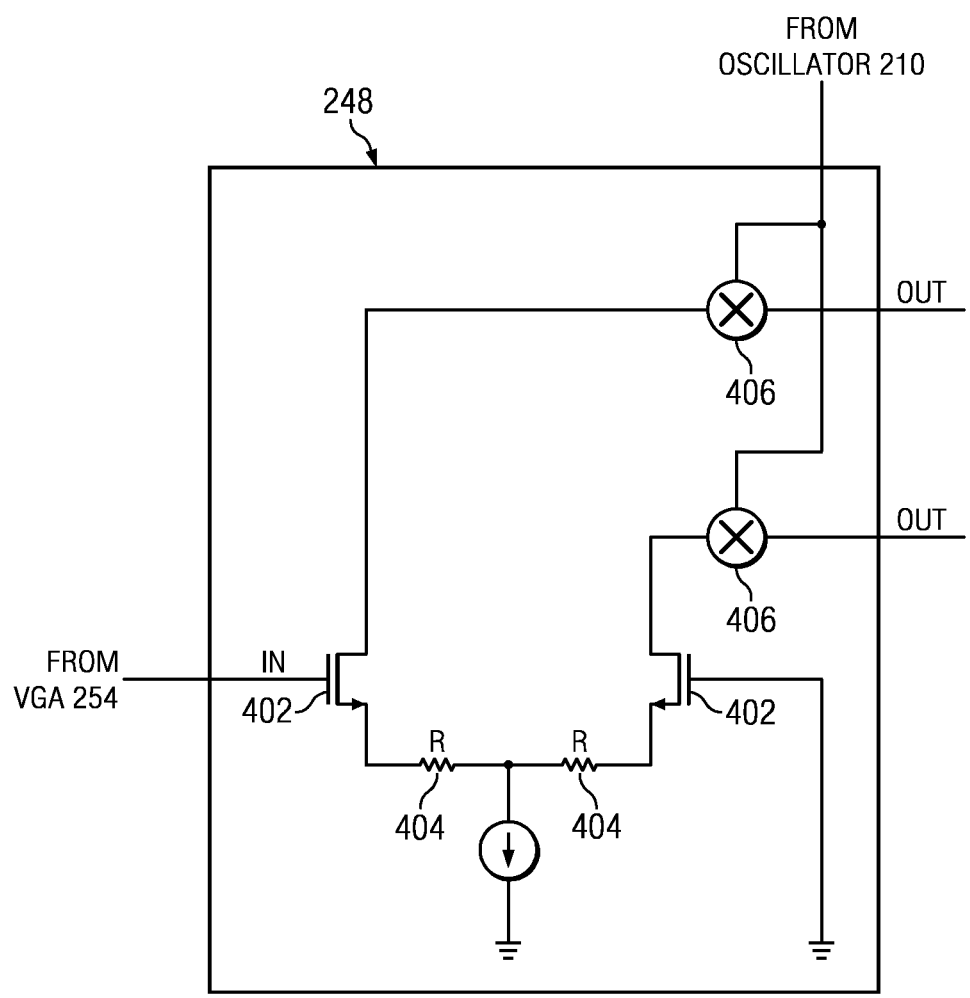
FIG. 4 illustrates a block diagram of selected components of an example downconverter/amplifier, in accordance with certain embodiments of the present disclosure.

Downconverter/amplifier 248 may be configured to frequency downconvert the analog signal received from VGA 254 by an oscillator signal provided by oscillator 210 (e.g., downconvert to a baseband signal) and output an in-phase (I) channel and quadrature (Q) channel components of for the signal. An example embodiment of downconverter/amplifier 248 is shown in FIG. 4. In addition, control path 214 may include an analog-to-digital converter (ADC) 244 for each of the I channel and Q channel, each ADC 244 configured to receive the appropriate component of the baseband signal convert such components of the signal into a digital components of the signal. The digital components of the signal output by ADCs 244 may be communicated to digital circuitry 202 for processing. Together, VGA 254, downconverter 246, ADCs 244, and/or other components may make up a coherent receiver coherent to transmit path 201.

Figure 3:
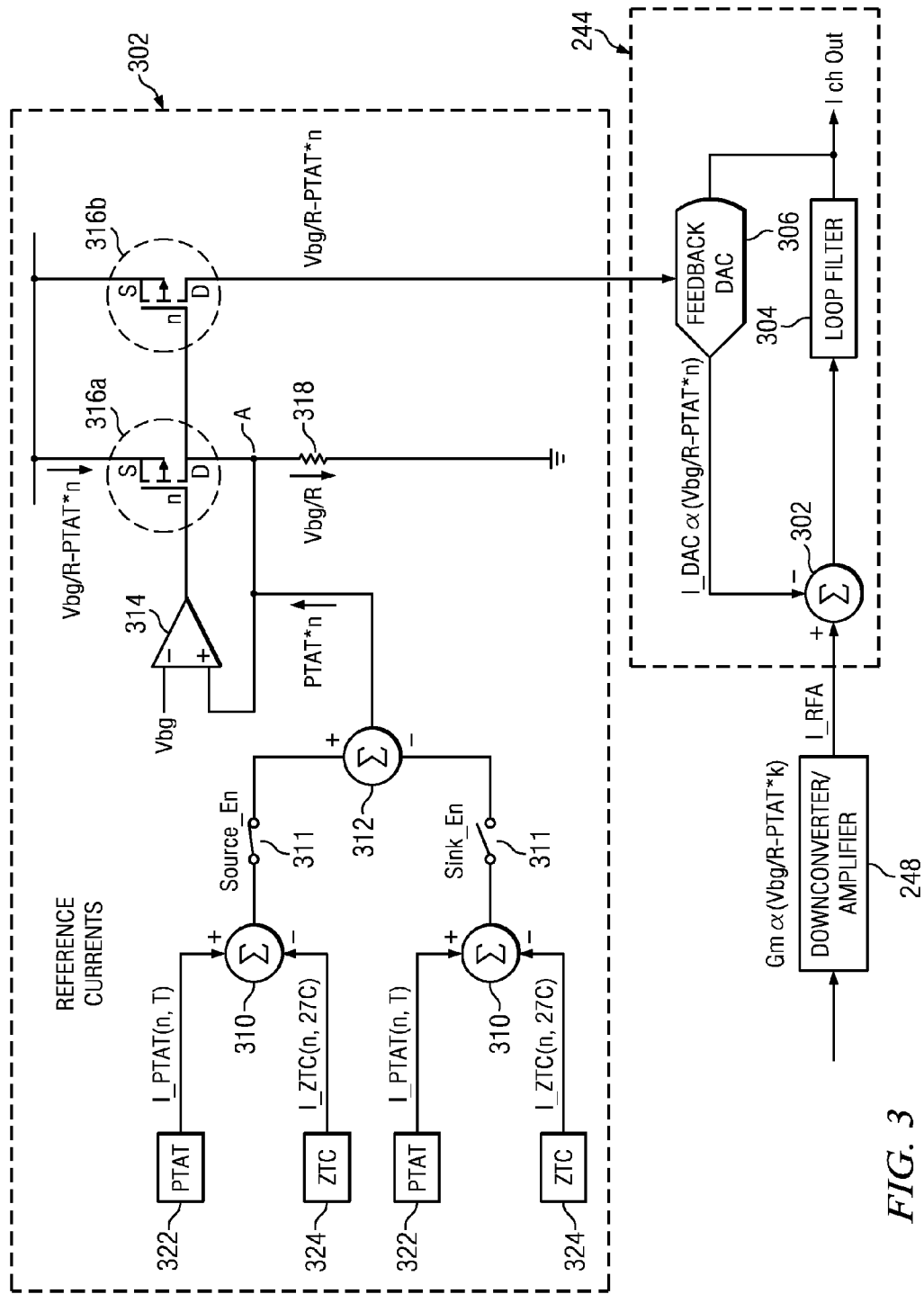
FIG. 3 illustrates a block diagram of selected components of a feedback control path of the wireless communication element depicted in FIG. 2, along with a biasing circuit for certain components of the feedback control path, in accordance with certain embodiments of the present disclosure.

For purposes of clarity and exposition, biasing circuits and elements of various components of wireless communication element 200 are not depicted in FIG. 2. However, FIG. 3 illustrates a block diagram of certain components of feedback control path 241, along with a biasing circuit 302 for certain components of feedback control path 241. For clarity and exposition, FIG. 3 depicts a signal path within feedback control path 241 for only one channel of a signal, rather than both the in-phase and quadrature channel.

As shown in FIG. 3, analog-to-digital converter 244 may be implemented using a summer 302, a loop filter 304, and a feedback DAC 306. Summer 302 may be any system, device, or apparatus configured to sum an analog signal from the output of downconverter/amplifier 248 to an analog signal from the output of feedback DAC 306. Loop filter 304 may be any system, device, or apparatus configured to, in connection with summer 302 and feedback DAC 306, convert an analog signal received from downconverter/amplifier 248 into a digital signal indicative of the received analog signal. Loop filter 304 may be implemented as an integrator, delta-sigma modulator, and/or any other suitable circuit. Feedback DAC 306 may be configured to convert the digital output of loop filter 304 into an analog signal to be subtracted by summer 302 from the analog signal received from downconverter 302. As shown in FIG. 3, biasing circuit 302 may provide a bias current to feedback DAC 306, thus enabling functionality of feedback DAC 306. As described in greater detail below, biasing circuit 302 may be configured to generate a bias current to offset variations of other components of feedback control path 241 (e.g., downconverter/amplifier 248) due to temperature.

FIG. 4 illustrates a block diagram of selected components of an example downconverter/amplifier 248, in accordance with certain embodiments of the present disclosure. As shown in FIG. 4, downconverter/amplifier 248 may include transistors 402 and resistors 404 having resistance R arranged to form a resistively-generated amplifier. In some embodiments, downconverter/amplifier 248 may include mixers 406 to downconvert an RF signal to baseband. In embodiments in which a baseband signal is received as an input to downconverter/amplifier 248, downconverter/amplifier 248 may not include mixers 406.

As mentioned previously, the performance and/or characteristics of various components of feedback control path 241 may vary with temperature. For example, a signal gain Gm of downconverter/amplifier 248 may be proportional to the quantity Vbg/R−PTAT*k, where Vbg is a bandgap voltage supplied to provide a bias current to downconverter/amplifier 248, R is a process-dependent resistance present in downconverter/amplifier 248 (e.g., a resistor 404 shown in FIG. 4), PTAT is a temperature-dependent current, and k is a scalar constant based on physical characteristics of downconverter/amplifier 248. To offset the temperature dependence of the gain of downconverter/amplifier 248 and/or other components of feedbackcontrol path 241, bias circuit 302 may be configured to generate a temperature-dependent bias current.

As depicted in FIG. 3, bias circuit 302 may include summers 310 and 312, switches 311, op amp 314, mirrored transistors 316 (e.g., transistors 316a and 316b), resistor 318, current proportional to ambient temperature circuits (PTATs) 322, and temperature-independent current circuits (ZTCs) 324.

A PTAT 322 may comprise any system, device, or apparatus configured to generate an electrical current proportional to an ambient temperature present proximate to such PTAT 322, wherein such electrical current is also a function of a predetermined scaling factor n. The scaling factor n may be set by an adjustable trim (e.g., by adjusting a resistance of a variable resistor or potentiometer) based on characterization of feedback control path 241, as described in greater detail below. A ZTC 324 may comprise any system, device, or apparatus configured to generate an electrical current independent of an ambient temperature present proximate to such ZTC 324, wherein such electrical current is also a function of a predetermined scaling factor n.

Each summer 310 may comprise any system, device, or apparatus configured to subtract a current generated by a ZTC 324 from a current generated by a PTAT 322, thus outputting an electrical current that is dependent upon temperature and the scaling factor n, wherein such electrical current will be approximately zero at a particular temperature. PTATs 322 and/or ZTCs 324 may be configured such that the particular temperature is a desired temperature (e.g., room temperature of approximately 27 degrees Celsius). Switches 311 and summer 312 may be configured such that the output of summer 312 either sources an electrical current output by a summer 310 or sinks an electrical current output by a summer 310, resulting in an electrical current that may be represented by the quantity PTAT*n.

Operational amplifier 314 may comprise any system, device, or apparatus with a differential input and either a single-ended or differential output (a single-ended output is depicted in FIG. 3), which is a multiple of the voltage difference between the input terminals. As shown in FIG. 3, the negative input terminal of operational amplifier 314 may be supplied with a bandgap voltage Vbg, while the positive input terminal may be coupled to the output of summer 312, a resistor 318, and an active-region terminal (e.g., source, drain, emitter, collector) of a mirrored transistor 316a. The output terminal may be coupled to gates of each of mirrored transistors 316.

Mirrored transistors 316 may include any suitable transistor. Transistors 316 are depicted in the specific embodiment of FIG. 3 as n-type metal-oxide semiconductor field-effect transistors (MOSFETs). As shown in FIG. 3, transistors 316 may be coupled to each other and to a rail voltage (e.g., VDD) at one of their active-region terminals (e.g., source, drain, emitter, collector) and coupled to each other and the output of operational amplifier 314 at their non-active-region terminals (e.g., base, collector). Those of skill in the art may appreciate that, as so configured, mirrored transistors 316 form a current mirror, such that a current sourced by and flowing through the various terminals of transistor 316b is approximately equal to the current sourced by and flowing through the various terminals of transistor 316a.

Resistor 318 may include any suitable resistive circuit element. In some embodiments, resistor 318 may be selected to have a resistance R based on a process resistance present in downconverter/amplifier 248 and/or other components of feedback control path 241. As shown in FIG. 3, resistor 318 may be coupled between the positive input terminal of operational amplifier 316 and a rail voltage (e.g., VSS). Those of skill in the art may appreciate that, as so configured, the voltage present at the positive input terminal of operational amplifier 314, and thus the voltage present at node A, will be approximately equal to Vbg. Accordingly, an electrical current flowing through resistor 318 will be approximately equal to Vbg/R. Accordingly, to satisfy Kirchoff's current law, the current flowing through transistor 316a may be approximately equal to Vbg/R−PTAT*n. Transistor 316b may mirror the current of transistor 316a, and such current may be provided as a bias current to ADC 244 (e.g., as a bias current to feedback DAC 306). Thus, the bias current provided to feedback DAC 306 and/or other components of ADC 244 may be approximately centered about Vbg/R, and vary linearly with temperature as a function of the scaling factor n.

As shown in FIG. 3, the output current of feedback DAC 306 may be proportional to the bias current, and thus, is a function of temperature, as given in the PTAT*n term of the bias current. As discussed earlier, performance of other components of feedback control path 241 may vary with temperature. For example, a gain Gm of downconverter/amplifier 248 may have temperature dependence and may be proportional to the quantity Vbg/R−PTAT*k, where k is a constant scaling factor based on physical properties of downconverter/amplifier 248. Accordingly, an output current generated by downconverter/amplifier 248 may also have temperature dependence and may be proportional to the quantity Vbg/R−PTAT*k. Because the output current of feedback DAC 306 is subtracted from downconverter/amplifier 248 at summer 302, temperature variance of downconverter/amplifier 248 and/or other components of feedback control path 241 may be offset, reduced, or eliminated if a suitable value for scaling factor n is selected. Thus, by characterizing the temperature-based performance of feedback control path 241, a manufacturer or other individual may select an appropriate value of n, such that feedback control path 241 may operate with little or no temperature dependence.

Modifications, additions, or omissions may be made to system 100 from the scope of the disclosure. The components of system 100 may be integrated or separated. Moreover, the operations of system 100 may be performed by more, fewer, or other components. As used in this document, "each" refers to each member of a set or each member of a subset of a set.

Although the present disclosure has been described with several embodiments, various changes and modifications may be suggested to one skilled in the art. It is intended that the present disclosure encompass such changes and modifications as fall within the scope of the appended claims.

What is claimed is:

1. A wireless communication element, comprising:
    a transmit path configured to convert a digital signal output by digital circuitry into a wireless communication signal;
    a control path communicatively coupled to the transmit path and configured to monitor and control one or more operational parameters associated with the transmit path, the control path comprising:
        a coherent receiver configured to receive the wireless communication signal; and
        a bias circuit electrically coupled to the coherent receiver and configured to generate a bias current for the coherent receiver, wherein the bias current is equal to:
            a bandgap voltage supplied to the bias circuit divided by a resistance selected to approximately match a process resistance integral to the coherent receiver; minus
            a temperature-dependent current multiplied by a predetermined scaling factors;
        the bias current configured to bias a feedback digital-to-analog converter of the coherent receiver, such that the feedback digital-to-analog converter outputs a current proportional to the bias current.

2. A wireless communication element according to claim 1, the temperature-dependent current including a positive current, a negative current, or a zero current.

3. A wireless communication element according to claim 1, the temperature-dependent current equal to zero at a particular temperature.

4. A wireless communication element according to claim 3, wherein the particular temperature is approximately equal to room temperature.

5. A wireless communication element according to claim 1, the coherent receiver comprising:
    a downconverter configured to downconvert the wireless communication signal into a downconverted signal based on an oscillator signal used to upconvert the digital signal into the wireless communication signal; and
    an analog-to-digital converter configured to convert the downconverter signal into a second digital signal, the analog-to-digital converter comprising the feedback digital-to-analog converter.

6. A wireless communication element according to claim 1, the coherent receiver having one or more elements with operational parameters that are a function of temperature.

7. A wireless communication element according to claim 1, the predetermined scaling factor based at least on characterization of operation of the coherent receiver.

8. A method comprising:
    generating a first current equal to a bandgap voltage divided by a resistance selected to approximately match a process resistance integral to a receiver;
    generating a second current equal to temperature-dependent current multiplied by a predetermined scaling factor;
    subtracting the second current from the first current to generate a bias current; and
    providing the bias current to a feedback digital-to-analog converter of the receiver, such that the feedback digital-to-analog converter outputs a current proportional to the bias current.

9. A method according to claim 8, the temperature-dependent current including a positive current, a negative current, or a zero current.

10. A method according to claim 8, the temperature-dependent current equal to zero at a particular temperature.

11. A method according to claim 10, wherein the particular temperature is approximately equal to room temperature.

12. A method according to claim 8, wherein the feedback digital-to-analog converter is included in an analog-to-digital converter of the receiver.

13. A method according to claim 8, the receiver having one or more elements with operational parameters that are a function of temperature.

14. A method according to claim 8, the predetermined scaling factor based at least on characterization of operation of the receiver.

15. A bias circuit comprising:
    a bias reference current portion configured to generate a first current equal to a bandgap voltage divided by a resistance selected to approximately match a process resistance integral to a receiver;
    a temperature reference current portion configured to generate a second current equal to temperature-dependent current multiplied by a predetermined scaling factor, the temperature reference current portion comprising:
        a current proportional to absolute temperature circuit for generating a current proportional to ambient temperature;
        a temperature-independent current source for generating a temperature-independent current; and
        a summer configured to subtract the temperature-independent current from the current proportional to ambient temperature in order to generate the second current; and
    a mirroring portion configured to generate a bias current equal to the first current minus the second current.

16. A bias circuit according to claim 15, the temperature-dependent current including a positive current, a negative current, or a zero current.

17. A bias circuit according to claim 15, the temperature-dependent current equal to zero at a particular temperature.

* * * * *